Sept. 25, 1951 K. C. BUGG 2,568,716

RECORD CHANGER

Filed Aug. 25, 1945 7 Sheets-Sheet 1

INVENTOR.
Kenly C. Bugg,
BY Atkinson, Huxley,
Byron & Knight
Attys.

Sept. 25, 1951 K. C. BUGG 2,568,716

RECORD CHANGER

Filed Aug. 25, 1945 7 Sheets-Sheet 2

INVENTOR.
Kenly C. Bugg,
BY
Dickinson, Hughes, Boyce & Bengtson Attys.

Sept. 25, 1951

K. C. BUGG 2,568,716

RECORD CHANGER

Filed Aug. 25, 1945

7 Sheets-Sheet 3

INVENTOR.
Kenly C. Bugg.
BY Atkinson, Huntley, Byron & Knight
Attys.

RECORD CHANGER

Filed Aug. 25, 1945 7 Sheets-Sheet 4

INVENTOR.
Kenly C. Bugg,
BY Atkinson, ... ,
Byrnes Knight
attys

Sept. 25, 1951 K. C. BUGG 2,568,716

RECORD CHANGER

Filed Aug. 25, 1945 7 Sheets-Sheet 5

INVENTOR.
Kenly C. Bugg,
BY Atkinson, Kingley, Byron & Knight
attys.

Sept. 25, 1951 K. C. BUGG 2,568,716

RECORD CHANGER

Filed Aug. 25, 1945 7 Sheets-Sheet 6

INVENTOR.
Kenly C. Bugg,
BY Atkinson, Huxley, Byron & Knight
Attys.

Sept. 25, 1951

K. C. BUGG 2,568,716

RECORD CHANGER

Filed Aug. 25, 1945

7 Sheets-Sheet 7

INVENTOR.
Kenly C. Bugg,
BY Dickinson, Wright, Byron & Knight
Attys.

Patented Sept. 25, 1951

2,568,716

UNITED STATES PATENT OFFICE 2,568,716

RECORD CHANGER

Kenly C. Bugg, Fort Wayne, Ind., assignor, by mesne assignments, to Farnsworth Research Corporation, a corporation of Indiana Application August 25, 1945, Serial No. 612,621

9 Claims. (Cl. 274—10)

This invention pertains to record changing mechanism for phonographs, electrically operated radio phonographs and the like.

It is an object of this invention to provide record changing mechanism wherein the records are handled by a device in a gentle mechanical manner to assure long record life.

Another object of the invention is to provide record changing mechanism wherein different sizes of records are readily played, regardless of the order of stacking and without any adjustment of the mechanism for handling the different size records.

Another object of the invention is to provide operating mechanism for a record changing device which is so constructed and arranged that the operation or reproduction is quiet, whereby no undesired vibrations are transmitted through the tone arm.

Another object of the invention is to provide record changing mechanism wherein the medium for dropping the records is not affected by warped or distorted records.

Another object of the invention is to provide record changing mechanism wherein the records are supported and dropped by means which does not come in contact with the sound track, as where such mechanism is operative adjacent the center of the record.

Another object of the invention is to provide record changing mechanism provided with a central, vertical post for storing and dropping the records, wherein when the bottom record is dropped to position to be played, the weight of the other stacked records is not on the bottom record.

Another object of the invention is to provide a record changing mechanism wherein the records are stored and dropped in a vertical direction along a single axis and as one record is being dropped to its position to be played, the other records are being resiliently supported, and thereafter the supported records are released to move to inoperative position, substantially serially, whereby more records may be stored and handled for playing, as it is not necessary to provide a powerful prime mover to shift the stored records.

Another object of the invention is to provide record changing mechanism wherein the records are so stored and so handled that operation of the tone arm in its required cycle of operation, even for different size records and for manual and automatic conditions of the device, is simple and rugged.

Another object of the invention is to provide record changing mechanism of simplified design, wherein mistakes of handling the records are reduced to a minimum.

Another object of the invention is to provide record changing mechanism provided with storing means and dropping means for the records, which are so simplified that the records can be changed quickly and easily and as simply as playing a record on the conventional turn table, as where only one record is being played.

Another object of the invention is to provide record changing mechanism wherein only the usual run-out and shut-off groove of the record is used to cause the tone arm to condition mechanism for causing the tone arm to move out of the path of the record to be next played.

Another object of the invention is to provide record changing mechanism having tone arm operating mechanism and adjusting means therefor, wherein the mechanism may be adjusted or calibrated for use with different sized records and wherein the adjustment may be readily and quickly made from the top of the machine without dismantling any parts thereof.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figures 4, 5, 6:
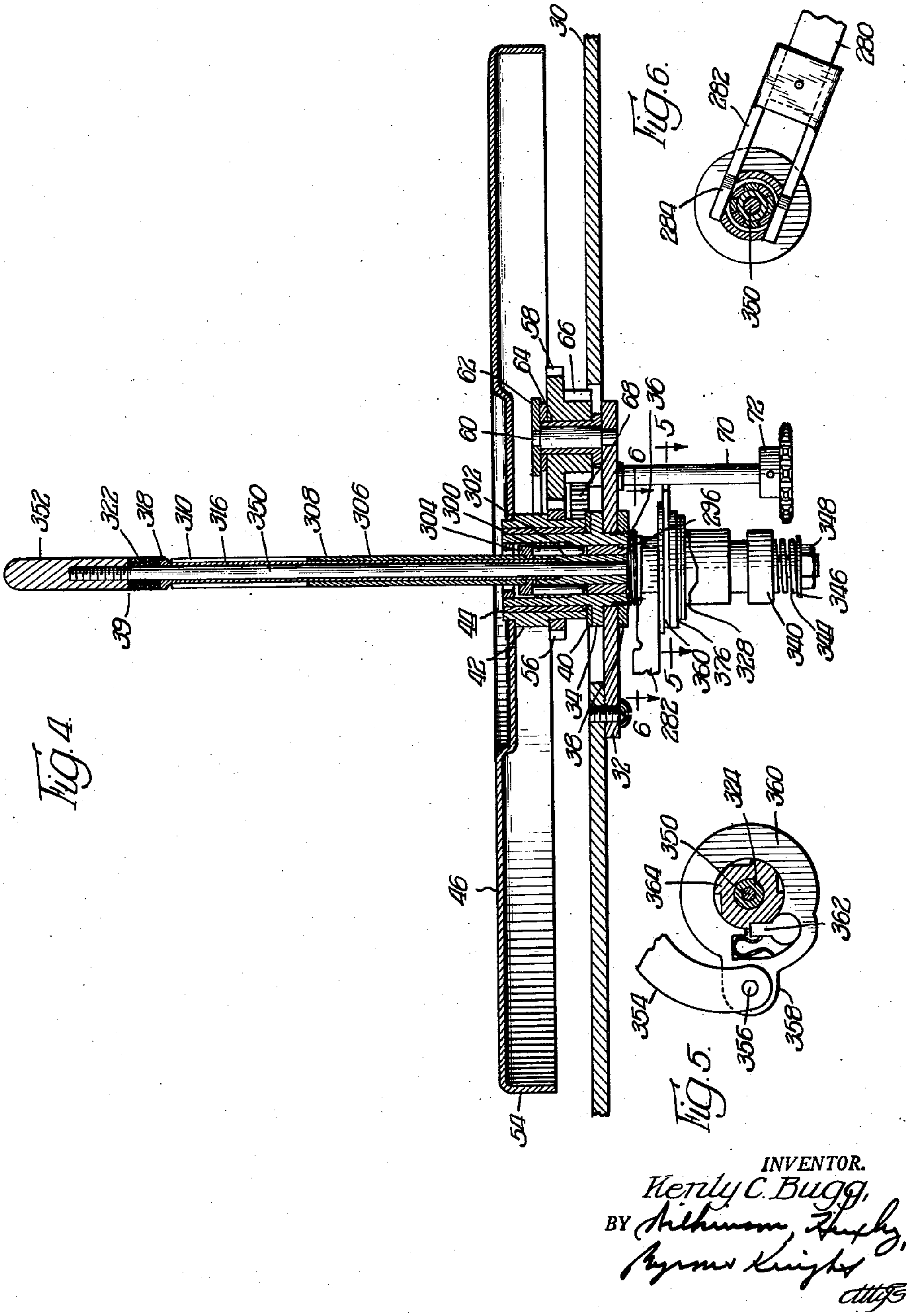
Figure 4 is an enlarged fragmentary sectional elevation through the central storing and dropping post and certain associated mechanism of the record changing mechanism illustrated in Figures 1 to 3, inclusive.
Figure 5 is an fragmentary sectional plan of a ratchet housing used in the record changing mechanism embodying the invention, the same being taken substantially in the plane as indicated by the line 5—5 of Figure 4.
Figure 6 is a fragmentary sectional plan of the lifting slide used in the record changing mechanism embodying the invention, the same being taken substantially in the plane as indicated by the line 6—6 of Figure 4.

The record changing mechanism illustrated, comprises the base 30 to which is secured the base member 32 (Fig. 4), which is provided with the bushing 34 threaded as at 36 for the reception of the securing nut 38, which fixedly secures the bushing to the base member 32. The bushing 34 provides a housing for certain control mechanism to be later described, for controlling operation of the center post storing and dropping assembly indicated generally at 39. The bushing 34 is provided with the bearing washer 40 on which the table bushing 42 is rotatably mounted, a suitable bearing sleeve 44 being interposed between the bushing 42 and the bushing 34. The table bushing 42 is non-rotatably provided with the table 46 for receiving the records to be played.

The base 30 is provided with the operating motor 48 (Fig. 1) which is adapted to be selectively and suitably operated, the motor being provided with the motor shaft 50 having a resilient driving wheel 52 thereon, which has bearing engagement with the rim 54 of the table, whereby the table is rotated upon operation of the motor.

The table bearing 42 is provided with the gear 56 which meshes with gear 58, which is pivotally mounted on the pin 60 (Fig. 4) which is carried by the member 32 and the strap 62, a bushing 64 being disposed between the gear 58 and the strap 62. Gear 58 is provided with the gear 66 which meshes with gear 68, which is non-rotatably provided on the shaft 70, one end of the shaft being journaled in the strap 62, and the shaft also being journaled in base member 32. The shaft 70 is provided with the sprocket 72 non-rotatably provided on the shaft 70, the sprocket 72 driving sprocket 74 (Fig. 2) through chain 76.

Figure 1:
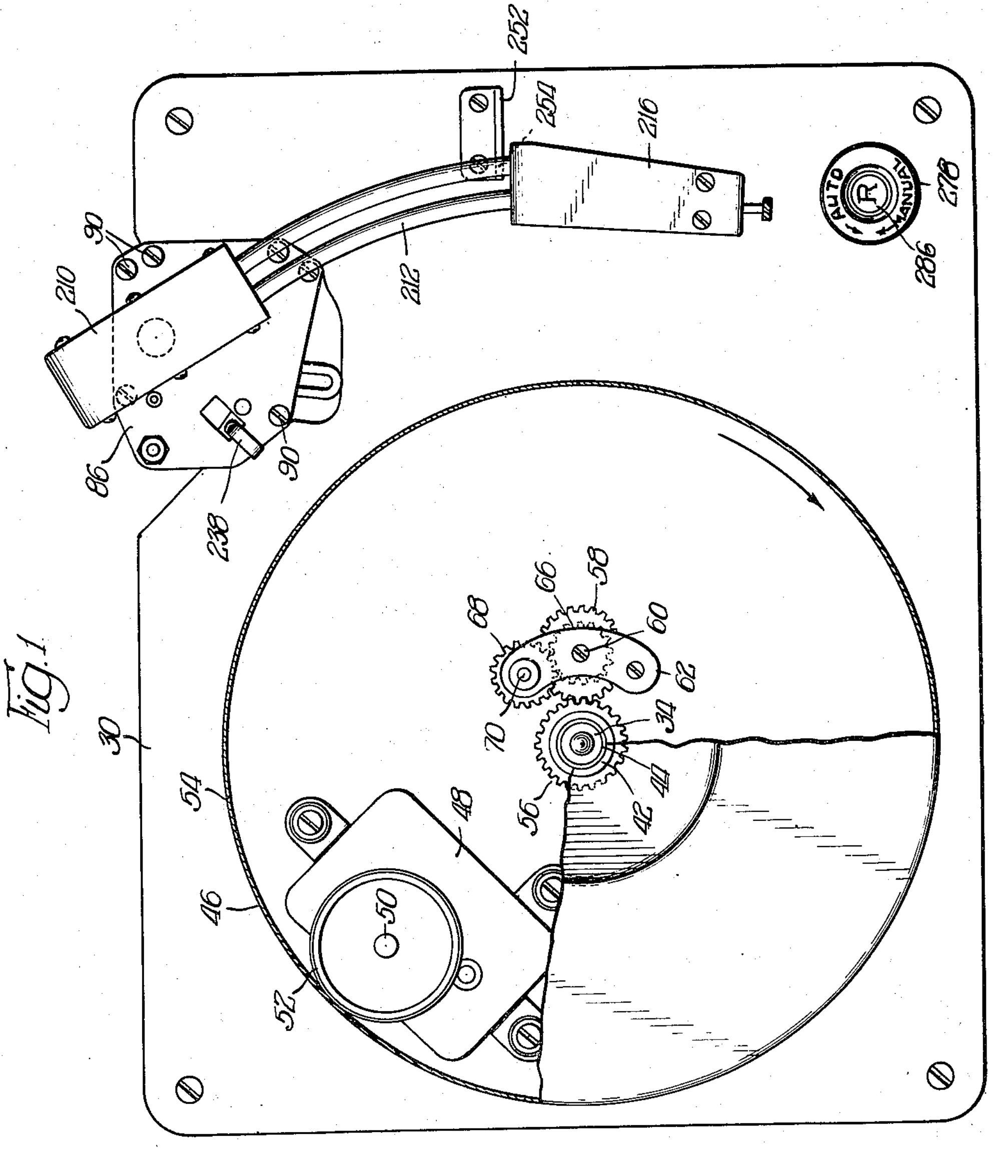
Figure 1 is a top plan view, partly in section, of a record changing mechanism embodying the invention.
Figure 2:
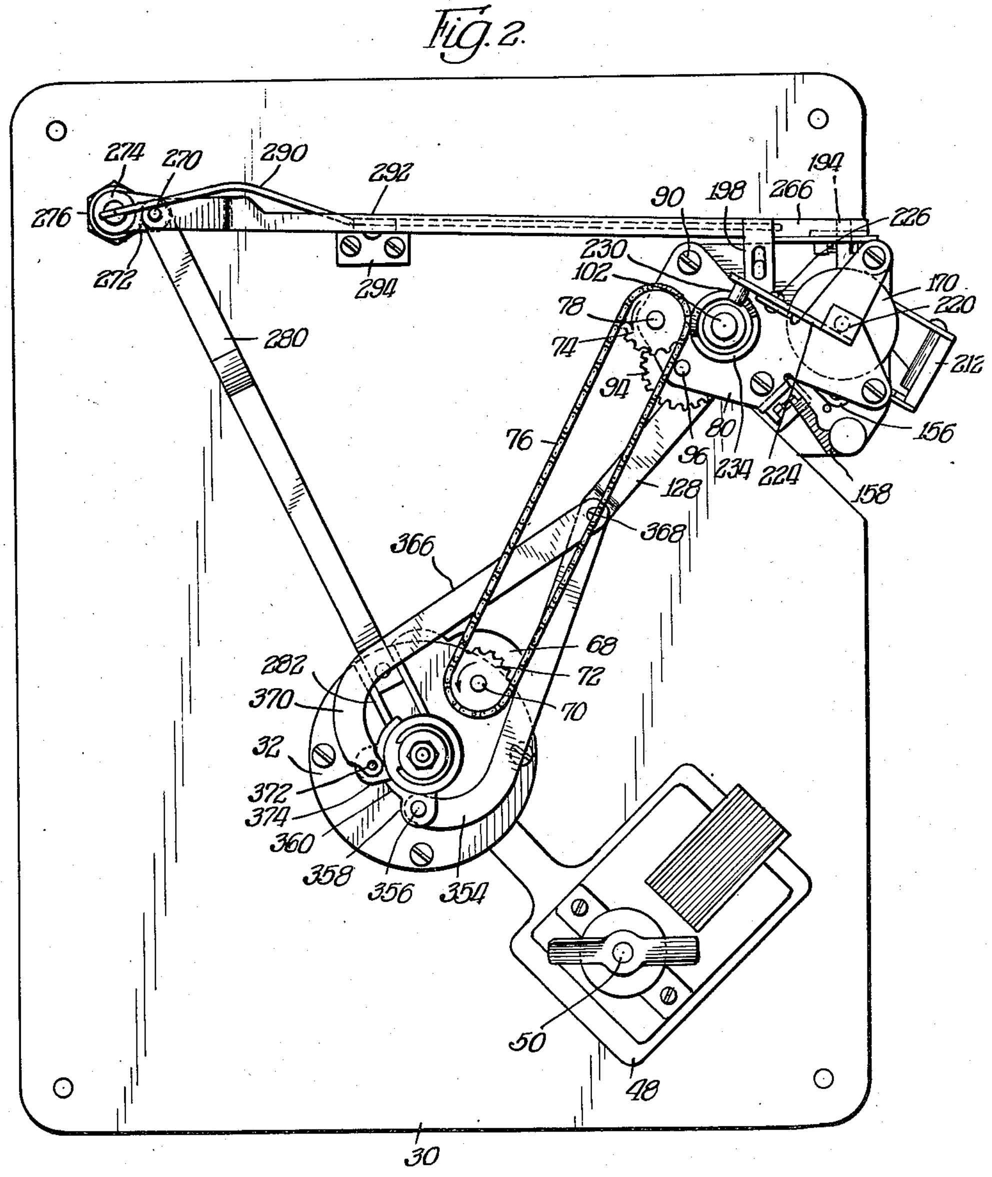
Figure 2 is a bottom plan view of the record changing mechanism embodying the invention.

Inasmuch as table 54 is rotating in a clockwise direction, as viewed in Figure 1, gear 68 rotates in a clockwise direction, sprockets 72 and 74 rotate in a counterclockwise direction, as viewed in Figure 2, and in a clockwise direction as viewed in Figure 1.

Figure 8:
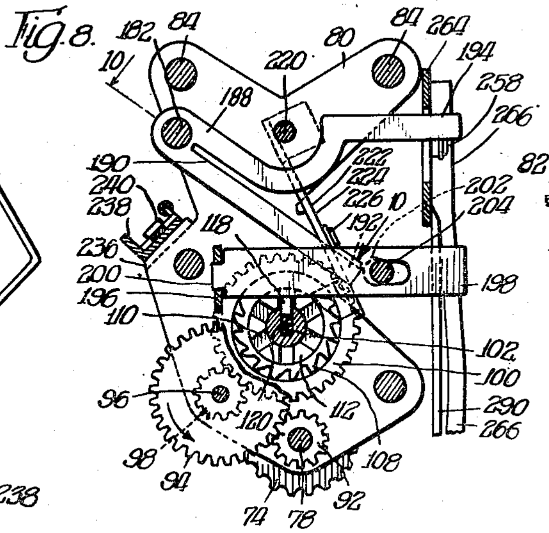
Figure 8 is a top plan view of certain of the operating mechanism taken substantially in the plane as indicated by the line 8—8 of Figure 3.

Sprocket 74 is non-rotatably mounted on the shaft 78 which is journaled adjacent one end in the plate 80 and at its other end in the plate 82 (Fig. 3), being suitably retained against longitudinal movement with respect thereto. Plate 80 is spaced from plate 82 by the spacers 84, and plate 82 is spaced from plate 86 by spacers 88, plate 86 being secured to plate 30. Plates 80, 82 and 86 are secured through suitable fastening means 90 to form an assembly. Shaft 78 is non-rotatably provided with gear 92 which in turn meshes with gear 94 (Figs. 2, 3 and 8) rotatably mounted on the fixed shaft 96 which is secured between plates 80 and 82. Gear 94 is non-rotatably provided with the gear 98 which, in turn, meshes with gear 100, which is rotatably mounted on a rotatable shaft 102, the shaft 102 being journaled as at 104 and 106 (Fig. 3) in plates 82 and 80, respectively, the end of the shaft 102 extending below the plate 80. The gear 100 is provided with the ratchet gear 108, the teeth facing in the direction as illustrated in Figure 8.

Ratchet gear 108, in turn, is provided with the radial channels 110, shown six in number, being formed by the gear 108 and the bushing 112 press fitted in gear 108 to be rotatable therewith and providing a bearing on the shaft 102. Shaft 102 is provided with the substantially inverted L-shaped pawl slot 114 in which the pawl 116 is movably mounted, the head 118 of said pawl being urged outwardly by means of the spring 120 whereby the head of the pawl 116 is urged to be received in one of the grooves 110. When received in the grooves 110, shaft 102 is rotatable with gear 108.

Figures 7, 10:
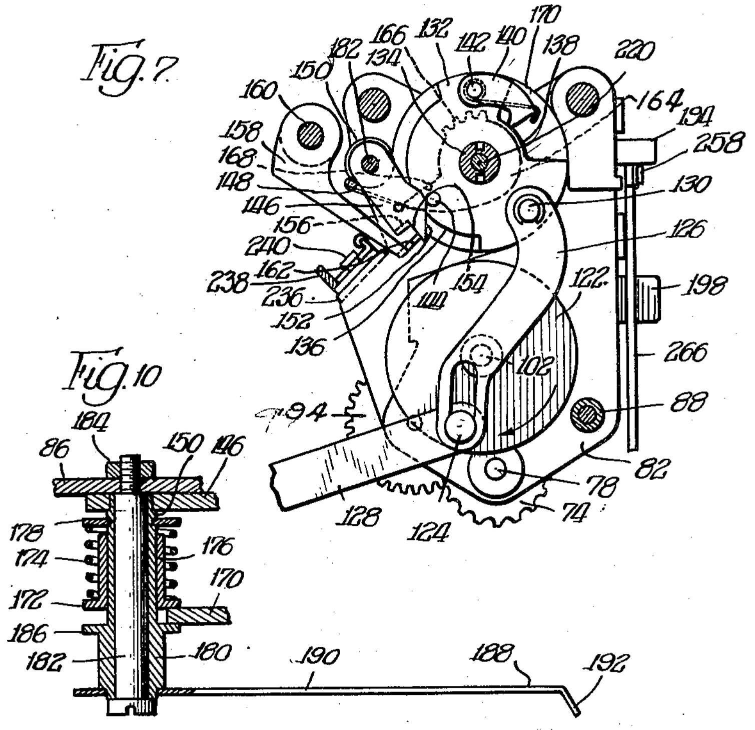
Figure 7 is a fragmentary top plan view of certain operating mechanism of the record changing mechanism embodying the invention, with the top plate thereof omitted, the same being taken substantially in the plane as indicated by the line 7—7 of Figure 3.
Figure 10 is a fragmentary, sectional elevation through the flexible cancelling arm and certain mechanism associated therewith, the same being taken substantially in the plane as indicated by the line 10—10 of Figure 8.

The shaft 102 above plate 82 is non-rotatably provided with the eccentric disk 122, said disk being provided with the pin 124 to which one end of the link 126 is loosely connected (Figure 7). The pin 124 is also pivoted to one end of one post crank arm 128.

The other end of link 126 is pivoted as at 130 to tone arm swinging disk 132 which is pivotally mounted on the shaft 134. The disk 132 is provided with the cutout portion or notch 136 and the opposed cut-out portion or notch 138, and pawl 140 is pivotally mounted as at 142 to disk 132, being resiliently urged toward the shaft 134, and being received in the cut-out portion 138, whereby inward movement of the pawl is limited. Disk 132 is provided with the pin 144 disposed opposite pawl 140, which pin extends upwardly from disk 132 and is adapted to engage the small record detent 146 whch is urged toward the pin 144 by spring 148, the detent being pivoted as at 150 to plate 86.

The detent 146 is provided with the inclined surface 152, adapted to be engaged by the pin 144, and is provided with the surface 154 and is also provided with the bent down lug 156. The floating large record detent 158 is pivoted as at 160 to the plate 86 and the end of said detent is provided with the lug 162 adapted to engage the surface 154 of detent 146 whereby movement of the detent 146 in a clockwise direction will move the detent 158 in a clockwise direction.

Immediately below the disk 132 the pawl 164 is provided non-rotatably mounted on the shaft 134, the pawl being provided with the teeth 166 and the positioning lug 168 which is adapted to engage the lug 156 of the detent 146, or to engage the lug 162 of the detent 158, whereby the lugs 156 and 162 act as stops for the pawl 164 when it is moving in a clockwise direction around its pivot.

Immediately below the pawl 164 and also fixed to the shaft 134, there is provided a wiping disk 170, the edge of which engages spring seat 172 of spring 174 (Figure 10), the spring seat being provided on the bushing 176. The upper end of the spring 174 is disposed on spring seat 178 provided on the bushing 180 which is rotatably mounted on the shaft 182 carried by the plate 86, being fixed thereto as at 184, said bushing being provided with the flange 186 spaced from flange 172, the edge of disk 170 being disposed between said flanges 172 and 186, the bushing 180 being provided with the flexible cancelling arm member 188. Shaft 182 provides the pivot 150 of detent 146. The arm member 188 is provided with the flexible arm 190 provided with the depending flanged end 192 and is provided with the flexible arm 194.

The plate 82 is provided with the member or lug 196 to which trip plate 198 is pivoted as at 200, the trip plate being supported in one position by the head 202 (Figure 8) of the support 204, and when the plate 198 is in supported position on the head 202 it is disposed in the path of the pawl 118, retaining the pawl in a position out of the grooves 110.

The support 86 is provided with the bearing post 206 (Figure 3) which is secured to the plate 86, and the shaft 134 is rotatably mounted therein. The shaft 134 is provided with connecting means 208 for connecting the bracket 210 thereto. The tone arm 212 is pivoted as at 214 to the bracket and is of the usual construction provided with the needle holding means and pick up 216 for the reception of the removable needle 218, the pick up being electrically connected in the well-known manner to reproduction means.

In order to move the tone arm 212 upwardly about the pivot 214 the hollow shaft 134 is provided with the lifting rod 220 slidably extending through the hollow shaft and being adapted to engage the tone arm. The lower end of the rod 220 is engaged by one arm 222 of the lever 224 which is pivoted as at 226 to the bracket 228 of the plate 80, and said lever 224 is provided with the arm 230 having suitable antifriction means 232 adapted to engage the cam member 234, said cam member being non-rotatably mounted on the lower end of shaft 102. Thus rotation of the cam member 234 oscillates the arm 222 to raise and lower the lifting rod 220 which in turn raises and lowers the tone arm.

Figure 11:
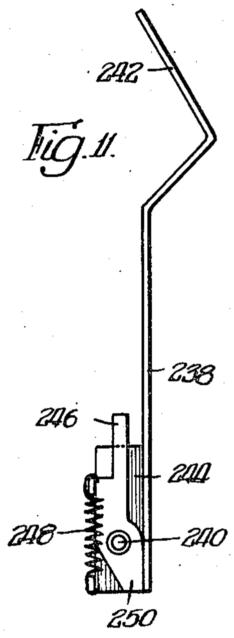
Figure 11 is an enlarged side elevation of the record indexing lever.

Plate 80 is provided with a bent up bracket 236 (Figures 7 and 8) to which the large record indexing lever 238 (Figures 7, 8 and 11) is pivoted by pivot 240. The lever 238 adjacent its upper end is provided with the indexing head 242 and in its lower end is provided with the bracket 244 through which the pivot 240 passes and the pawl 246 is pivoted to said bracket at pivot 240, a spring 248 being interposed between the bracket and pawl urging the pawl in a counterclockwise direction as viewed in Figure 11, a stop portion 250 of the pawl limiting the position thereof.

The support 30 is provided with the upstanding tone arm stop 252 which stop limits the outermost position of the tone arm and also provides a support to 254 for supporting the tone arm in inoperative position. Plate 82 is provided with the downwardly directed bracket 256 (Figure 3) provided with the pin 258 which extends through a slot 260 provided in the shouldered bracket 264 of the manual control link 266. Link 266 extends across the base 30, is flanged and reflanged as at 268, and is pivoted as at 270 to the arm 272 of the bushing 274 which extends upwardly and is secured against vertical movement by the nut 276 and the selection knob 278 disposed above base 30.

Link 280 is also pivoted to arm 272 at 270 adjacent one end of said link, the other end of said link being provided with the lifting slide 282 (Figures 2, 5, 6, 12, 13 and 14), being in the form of spaced arms provided with the cams 284.

Reject button (R) 286 is vertically and slidably mounted in the knob 278, the lower end of said reject button being pivoted as at 288 to one end of the lever 290. The lever 290 is pivoted intermediate its ends as at 292 to the bracket 294 provided on the base 30, the other end of said lever 290 extending under the trip plate 198 whereby when the reject button is depressed the lever 290 will rock about the pivot 292 to lift the trip plate 198 out of the path of the pawl 118.

Bushing 34 (Figures 4, 12, 13 and 14) is provided with a lifting sleeve 296 and is provided with the spaced cam faces 298 which are disposed opposite each other. The cam faces are adapted to engage and move the spaced pins 300, said pins being slidably mounted in the housing 302. The upper ends of the pins 300 engage the base member 304 to which the quill 306 is fixedly mounted, the quill being part of the center post assembly 39. The quill 306 includes a cylindrical portion 308 and the resilient fingers 310 of suitable number, the resilience of the fingers 310 causing them to be urged toward the axis of the quill 306. The upper edges of the fingers are beveled slightly downwardly to form a supporting ridge 312 for supporting the stack of records 314 in inoperative position. Within the quill 306 there is disposed a sleeve 316 which is provided with the cam 318, which, when the quill is moved upwardly, causes the fingers 310 to move outwardly, whereby the ridge 312 of said fingers is disposed in record engaging position as shown in Figure 13, whereby the lower record is supported substantially over the entire circumference of the center hole.

The sleeve 316 is provided with the seat 320 for the reception of the plurality of resilient rings or washers 322 which are of relatively small thickness, whereby when said washers are subjected to compression, substantially the entire outer peripheral surface of said washers moves outwardly to engage within the hole of the adjacent records over a surface, i. e., the contact between the washers and the record is over a surface rather than a line. The rings or washers 322 may consist of rubber or other suitable material.

The lower end of the sleeve 316 is fixedly mounted in the sleeve 324 which extends downwardly (Figure 14) and is provided with the bearing member 326 which engages and supports the cam bushing 328 which is provided with the oppositely disposed cams 330. The lower end of the sleeve 324 is provided with spaced keyways 332 for the reception of keys 334 which prevents rotation of the lower or main compression cam member 336 with respect to the sleeve 324. The compression cam member 336 is provided with the cam portions 338 which are adapted to have cooperative engagement with cams 330.

The spring housing 340 is disposed below the cam member 336 providing a spring seat 342 for one end of the spring 344. The other end of said spring seats on spring seat 346 held by the nut 348 to the compressing rod and post 350, which is part of the center post assembly 39. Said post 350 extends upwardly through sleeve 324, through the rubber rings 322, and is provided adjacent the upper end thereof with the compression head and record pilot 352, the lower end of said pilot 352 providing a compression seat 353 for the resilient washers 322.

The link 128 (Figure 2) is provided with an arcuate portion 354 which is pivoted as at 356 to the arm 358 of the ratchet housing 360. The ratchet housing is provided with the spring pressed pawl 362 urged toward the ratchet 364 (Figures 2, 5 and 14) of the cam bushing 328. Inasmuch as the cam bushing 328 is only to be rotated through 180° per cycle, as will be later described, the ratchet 364 is provided with four equally spaced teeth.

The link 128 is provided with the link 366 pivotally connected thereto as at 368, the other end of said link being provided with the arcuate portion 370 pivotally connected as at 372 to the arm 374 of the ratchet housing 376 disposed below the housing 360 and similar thereto. Said housing is also provided with a pawl cooperating with the ratchet 364. The housings 360 and 376 are supported by the bearing rings 378 carried by the cam bushing 328.

Let it be assumed that the machine is in condition where no records are supported on the post assembly 39, and the operating motor 48 is energized to rotate the table 46 and the reproduction mechanism is conditioned for operation. If it is desired to stack a number of records to be played in inoperative position, and have the records played automatically in sequence, it being immaterial whether large or small records are intermixed, the knob 278 is turned in a counterclockwise direction as viewed in Figure 1, so that it is in "Automatic" position. In turning the knob to "Automatic" position the arm 272 is rotated, causing the link 280 to move the cams 284 to the position illustrated in Figure 13, whereby the lifting sleeve 296 is caused to move the pins 300 upwardly, moving the quill 306 upwardly, causing the fingers of the quill to be spread outwardly by the cam 318. The records 314 may then be placed over the head and pilot 352 to be supported in their raised supported position as shown in Figure 13. At the same time knob 278 is rotated, link 266 is moved toward the left as viewed in Figure 3, moving the bracket 264 out of the path of flexible arm 194, whereby the arm member 188 is free to pivot about the shaft 182 (pivot 150).

The reject button 286 is then depressed and released. Depressing the button 286 will cause the lever 290 to rock about the pivot 292 moving the opposite end of the lever upwardly (Figure 3) causing the trip plate 198 to move upwardly from its support 202 pivoting about the pivot 200. Movement of the trip plate about its pivot 200 permits the pawl 118 to be received in a slot 110. As the switch operating the motor 48 has caused the motor to be energized, the turn table 54 is rotating, which in turn causes free rotation of the gear 100 and ratchet 108 and, consequently, slots 110. When the pawl 118 is received on one of the slots 110, the shaft 102 will be rotated until the pawl 118 engages the trip plate 198, at which time the pawl 118 will be moved out of the slot 110 in which it was engaged and the shaft 102 will cease rotation, having rotated through 360°.

Figure 9:
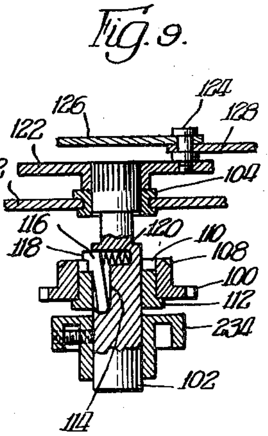
Figure 9 is a fragmentary sectional elevation through one of the operating shafts, the same being taken substantially in the plane as indicated by the line 9—9 of Figure 3.

Rotation of the shaft 102 through 360° causes rotation of the pin 124 (Figures 7 and 9) through 360°, causing oscillation of the link 126 which oscillates the tone arm swinging disk 132. As the pin 124 is connected to the link 126 by a loose connection, a small movement of the pin 124 will cause no movement of translation of the link 126, but the cam 234 (Figure 3) will operate the lever 224 to raise the tone arm by the lifting rod 220. When the lost motion connection is exhausted, i. e., when pin 124 has moved the length of the slot in link 126, pin 130 is moved to cause rotation of the tone arm swinging disk 132, moving the pawl 140 to a position to engage teeth 166. Movement of the pin 124 will also move the link 128, moving the housings 360 and 376 to cause the housing of link 366 (Figure 2) to pull the ratchet 364 through 45°, and thereafter causing the ratchet of link 354 to push the ratchet 364 through 45'

Figure 12:
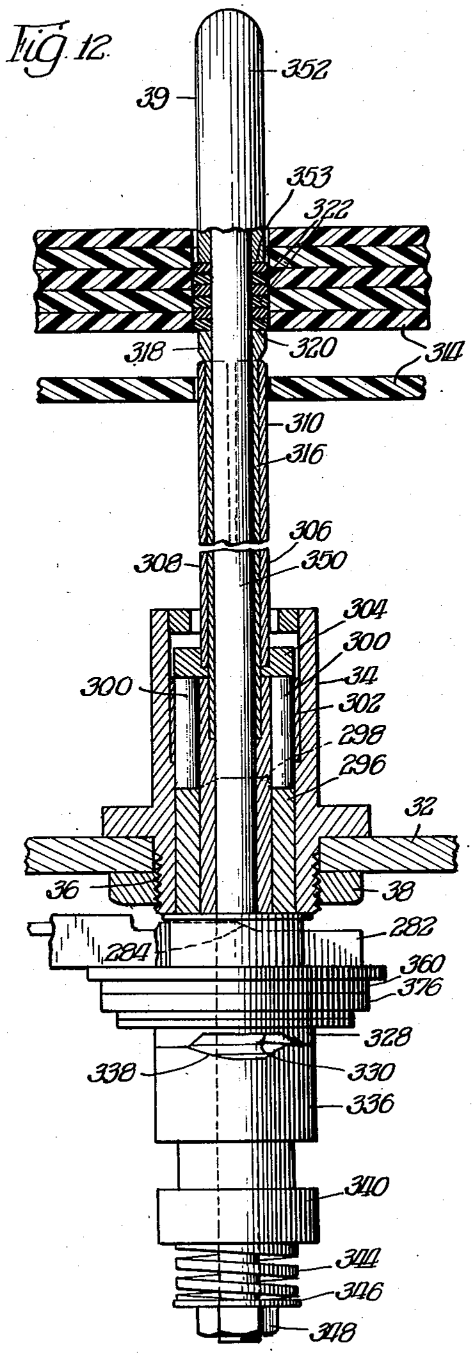
Figure 12 is an enlarged fragmentary sectional elevation through the supporting post and certain associated mechanism, showing the same in position where the bottom record of the stack is descending while the remaining records in the stack are being supported.
Figure 13:
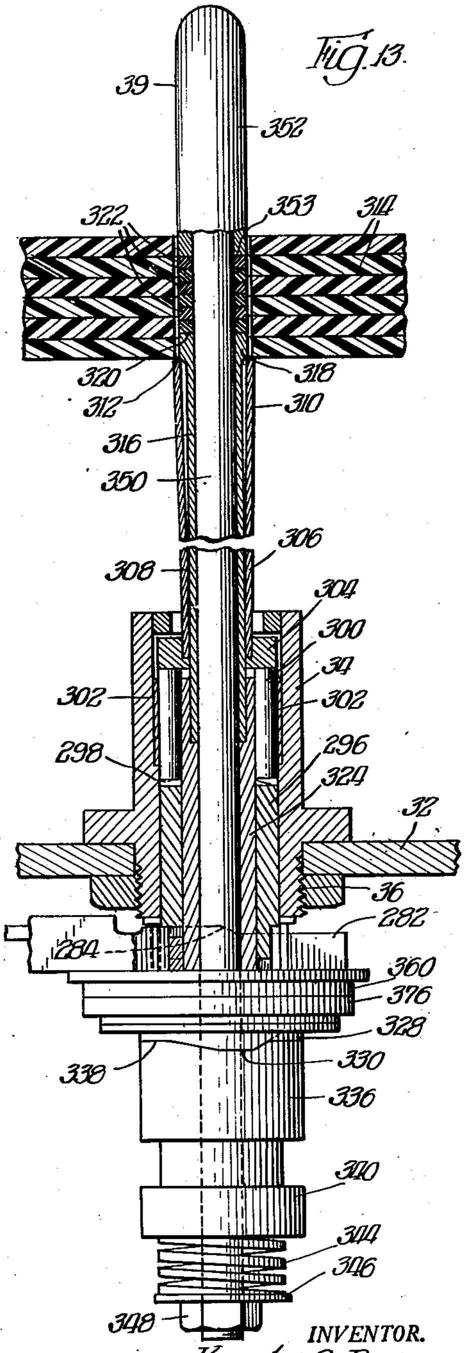
Figure 13 is an enlarged fragmentary sectional elevation corresponding to Figure 12, showing the mechanism in position where an entire stack of records is being supported in inoperative position.
Figures 14, 15, 16:
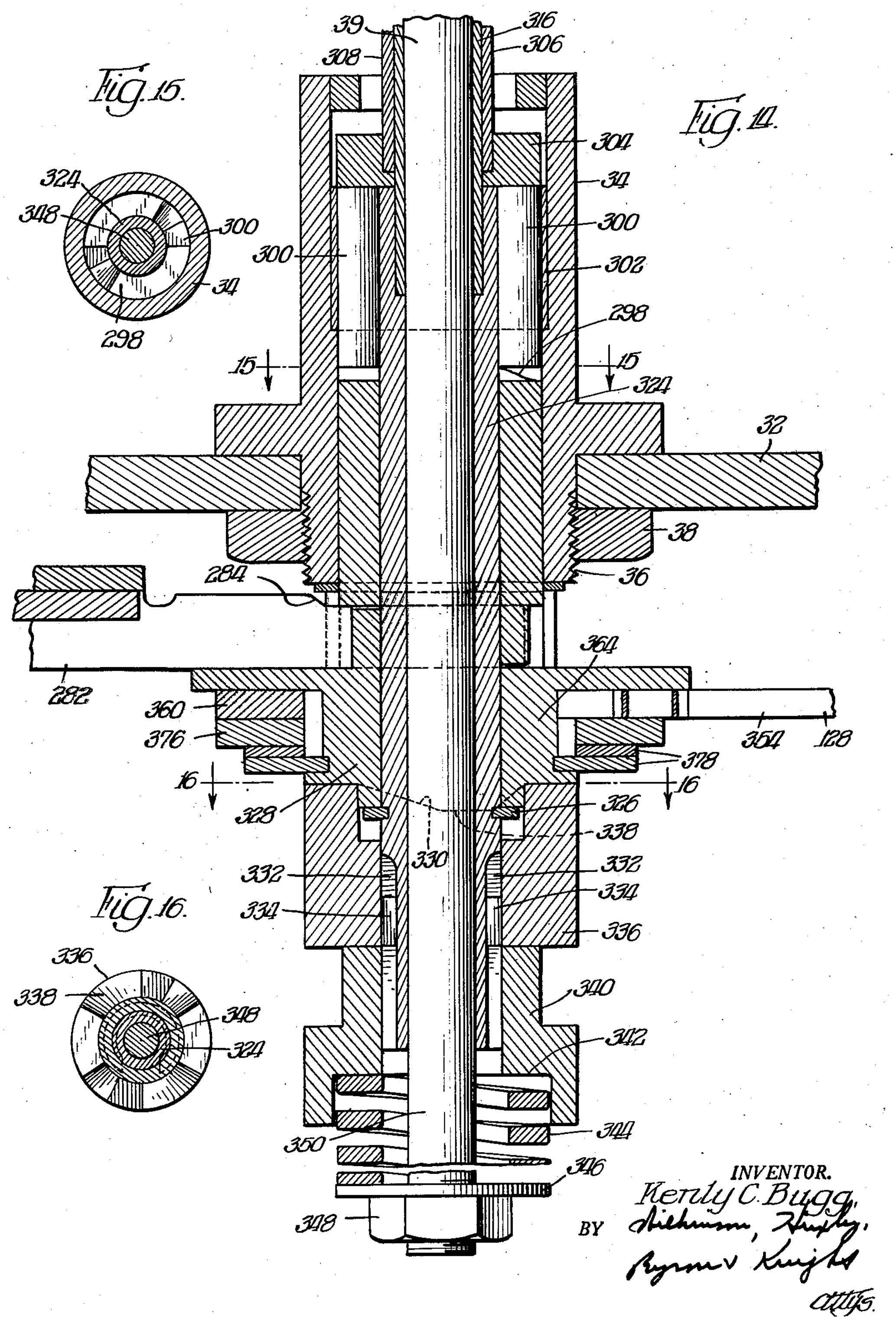
Figure 14 is an enlarged fragmentary sectional elevation through a portion of the supporting and control post and associated operating mechanism.
Figure 15 is a transverse sectional plan taken substantially in the plane as indicated by the line 15—15 of Figure 14.
Figure 16 is a transverse sectional plan taken substantially in the plane as indicated by the line 16—16 of Figure 14.

When the pin 124 moves through 90° the link 128 has moved the cam bushing 328 through 45°, causing cam 330 to move over cam 338, compressing the spring 344 and in turn moving the head 352 downwardly, compressing the rubber washers 322 to record holding position, such as shown in Figure 12. At the time the washers 322 are compressed the fingers 310 are still in record supporting position (Figure 13), but by expanding the washers all of the records are supported by the washers with the exception of the lowermost record, which is supported by the fingers 310. Movement of the pin 124 through its next 90° causes the bushing 328 to move another 45° permitting the pins 300 to move downwardly to the position shown in Figure 12, whereby the fingers 310 are collapsed, permitting the bottom record to move downwardly to its position on the turn table 46. In the meantime, as the disk 132 has been moved through substantially 90° (Figure 7), the tone arm has been urged toward the support 252, and has been maintained in its raised or lifted position by the cam 234. So far the disk 122 has moved through 180° and the bushing 328 has moved through 90°.

Let us assume that a small record has dropped to position on the table 46. As the disk 132 has been moved, the pin 144 has been moved out of the path of the detent 146. In this position of disk 132, as the pawl 140 has engaged one of the teeth 166, the movement of the return of the pin 124 through its remaining 180° causes the pawl 140 to move in a clockwise direction, causing the edge of lug 168 (of the pawl 164) to engage the positioning lug 156 of the small record detent. Thus the position of shaft 134 is limited by engagement of lugs 168 and 156 and thus the tone arm 212 is positioned in proper position for the needle 218 to engage in the proper starting groove of the record, inasmuch as the sleeve 134 has been rotated as it is attached to the pawl 164.

While lug 168 is in engagement with the lug 156, the shaft 102 will have rotated through 360°, permitting the cam 234 to cause lifting rod 220 to move downwardly, permitting engagement of the needle 218 with the record. As the pin 124 is moving to its initial position, it rotates the cam bushing 328 through an additional 45°, causing upward movement of the pins 300, moving the fingers 310 of the quill to the position shown in Figure 13, where the ridge 312 of the fingers is in a position to be in the path of downward movement of the now bottom record. The final movement of the pin 124 to its initial position causes an additional rotation of 45° to the bushing 328 permitting upward movement of the post 350 permitting a return of the rubber washers 322 to the normal or uncompressed positions illustrated in Figure 13, and as the cams 338 and 330 are gradual, they permit a gradual return of the washers 322 to normal position, thus permitting a gradual drop of the records 314 to the position where they are supported on the fingers 310 as shown in Figure 13.

When the needle enters the run-out groove of the record, it causes an oscillation of the shaft 134 causing oscillation of the wiping disk 170 (Figure 7), which in turn causes oscillation of the arm 190 (Figures 8 and 10), inasmuch as disk 170 is frictionally held between seat 172 and flange 186 whereby rotation or oscillation of the disk 170 causes rotation or oscillation, of the bushing 180 and, consequently of arm 190. Oscillation of the arm 190 causes the end 192 to momentarily engage the teeth of the ratchet 108 (Figure 8) permitting the teeth to oscillate the arm 190 in a direction normal to the plane of the arm 190, thereby causing upward movement of the trip plate 198 about its pivot 200. This permits the pawl 118 to enter a recess 110 causing the shaft 102 to again be rotated through 360°, in turn causing the cam 234 to move the lifting rod 220 upwardly, disengaging the needle from the record. Rotation of the shaft 102 through 360° again causes the pin 124 to move through 360° which causes the disk 132 to move through its oscillation cycle, causing the pawl 140 to move the shaft 134 through teeth 166 to return the tone arm toward the stop 252, at which time the cycle is completed and the device is ready to repeat its operation.

Let us assume, then, that the next record to be played is a large record. As the pin 124 is moving through the last mentioned 360°, the cycle is being repeated, permitting the now bottom record to be dropped after the tone arm has moved out of its path, and in descending, the large record engages the indexing head 242 of indexing lever 238 to cause the lever to move about the pivot 240, urging the pawl 246 toward the large record detent 158 which is moved toward the pivot of the pawl 164, i. e., counterclockwise about pivot 160 (Figure 7). Thus it is moved into the path of the lug 168 whereby upon return of the pawl 164 the lug 168 will engage the lug 162 to cause it to be effective rather than the lug 156. This, then, causes the tone arm to be indexed to its proper position where the needle engages its proper groove in the larger record, inasmuch as the lug 162 does not permit the shaft 134 and consequently the tone arm 212 to move as far as if the lug 156 is operating. When the disk 132 is moved back to its initial position the pin 144 engages the detent 146 and moves the detent 146 and thus the detent 158 in a clockwise direction (Figure 7) whereby the lugs 156 and 162 are out of the path of the lug 168, allowing free motion of the tone arm while playing.

Inasmuch as the detent 146 is spring loaded, it is always returned to a position to be operative, unless the floating detent 156 becomes operative by a large record operating the indexing lever 238 as above described.

Figure 3:
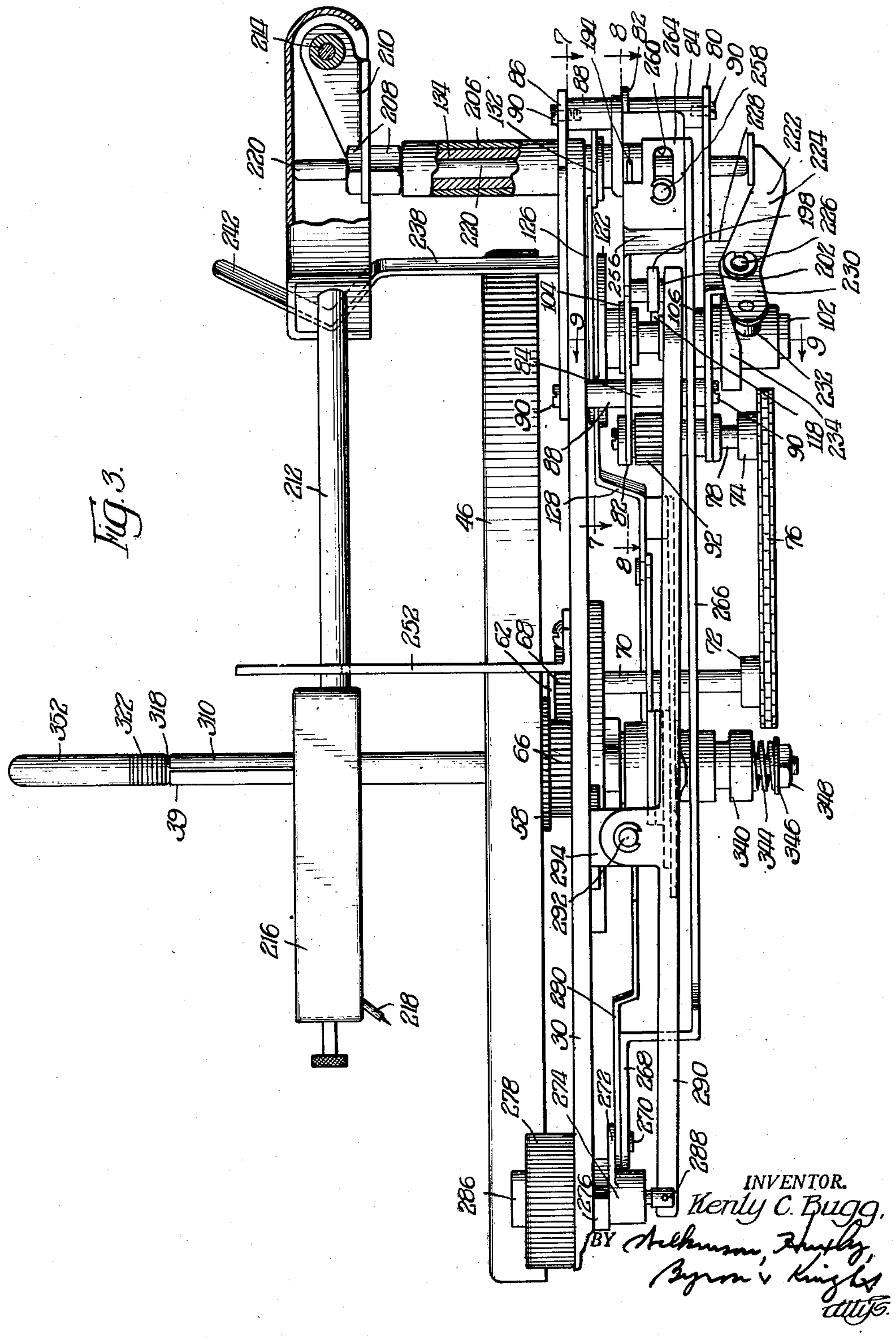
Figure 3 is an enlarged side elevation, partly in section, of the record changing mechanism illustrated in Figures 1 and 2.

In order to remove the records, the knob 278 is moved to "Manual" position by rotation in a clockwise direction (Figure 1), withdrawing the cams 284 by moving link 280 toward the left as viewed in Figure 3, permitting downward movement of the pins 300 whereby the fingers 310 are collapsed to permit removal of the records over the post. At the same time the knob is moved to "Manual" position, the link 266 also is moved, to move the bracket 264 to a position for preventing movement of the arm member 188, thus permitting manual operating of the tone arm and the record table at will and for so long as the knob 278 remains in "Manual" position.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In record changing mechanism, the combination of a rotatable record table for supporting a record to be played, the record having a central aperture, means for rotating said table, and means disposed on the axis of rotation of said record table adapted to extend through the central apertures of a plurality of records and adapted to support said records in inoperative position above said record table, said last named means comprising a central reciprocatory rod having a compression head and record pilot adjacent its upper end for passing through the central apertures of the records, a stationary sleeve member through which said rod extends and provided with a support for a plurality of resilient washers of substantially no greater thickness than the thickness of the records and adapted to be disposed within the central apertures of records and normally of less diameter than the diameter of the record apertures, said sleeve having a cam, a quill member through which said sleeve extends having a plurality of resilient fingers extending to a point adjacent said cam, said quill being movable upwardly of said sleeve into engagement with said cam whereby said cam expands said fingers to dispose them with a greater diameter than the record aperture diameter whereby said fingers support the lowermost record, said fingers being spaced from the lowermost resilient washer resting on said washer support by a distance of at least the thickness of a record, means operatively associated with said rod and with said quill member adapted to move said rod downwardly to cause compression of said resilient washers whereby the diameter of said washers is increased to engage the records within the apertures of records, and to lower said quill to disengage said fingers from said cam whereby the bottom unsupported record moves to said table whereby it may be played.

2. In record changing mechanism, the combination of a rotatable record table for supporting a record to be played, the record having a central aperture, a sound track and a run-out groove, means for rotating said table, a tone arm having pick-up mechanism adapted to be connected to reproduction mechanism, a fixed support for said tone arm, a hollow bearing post pivotally connected to said tone arm, a lifting rod slidably mounted in said post and adapted to raise and lower said tone arm, a lever for raising and lowering said lifting rod, a cam for operating said lever, a shaft for rotating said cam, a gear for rotating said shaft, a clutch between said shaft and gear, rendering means normally rendering said clutch inoperative, means for driving said gear, means operatively associated with said rendering means and responsive to a predetermined condition to ineffectuate said rendering means through an angle of rotation of said shaft of substantially 360° whereby said gear is enabled to rotate said shaft through substantially 360°, and record supporting and delivery means disposed on the axis of rotation of said record table adapted to extend through the central apertures of a plurality of records and adapted to support said records in inoperative position above said record table, said last named means comprising a central reciprocatory rod having a compression head and record pilot adjacent its upper end for passing through the central apertures of the records, a stationary sleeve member through which said rod extends and provided with a support for a plurality of resilient washers of substantially no greater thickness than the thickness of the records and adapted to be disposed within the central apertures of records and normally of less diameter than the diameter of the record apertures, said sleeve having a cam, a quill member through which said sleeve extends having a plurality of resilient fingers extending to a point adjacent said cam, said quill being normally in a record supporting position on said sleeve in engagement with said cam wherein said cam causes expansion of said fingers to dispose them with a greater diameter than the record aperture diameter whereby said fingers support the lowermost record, said fingers being spaced from the lowermost washer supported on the washer support by a distance of at least the thickness of a record said quill member being slidably movable on said sleeve to a record releasing position wherein said fingers are out of contact with said cam and disposed with a smaller diameter than the record aperture diameter, means for moving said quill member to its record supporting position, a pivoted flexible arm member, means movable with said last named means adapted to lock said arm member against rotation in one position and to unlock said arm member when said fingers are moved to expanded position, a lever operatively associated with said rendering means rockably to ineffectuate said rendering means for an angle of rotation of said shaft of substantially 360° to cause the clutch to become operative to rotate the first named shaft through substantially 360°, a disk member on said shaft rotatable therewith, a connection between said disk member and said hollow post for oscillating said post, said connection including an oscillatable pawl movable by said disk member, a pawl fixed to said hollow post having teeth adapted to be engaged by said first named pawl, operative means movable by said disk and associated with said reciprocatory rod for compressing said washers to record holding position wherein the diameters of said washers are increased to support all except the lowermost record, means operatively associated with said quill member and said disk for moving said quill member to said record releasing position upon further movement of the disk thereby to disengage said fingers from said cam thereby permitting movement of the lowermost record to supported position on the table ready to be played, detent means for limiting the movement of said second named pawl whereby the position of the tone arm is determined with respect to the beginning of a record sound track, rotation of the first named cam through 360° causing the tone arm to be lowered to playing position, return of said disk member to initial position causing the quill to be expanded to record holding position and release of the resilient washers from expanded position, means controlled by a record in moving to playing position controlling the detent means whereby the position of the tone arm is regulated according to the size of the record to be played, and means controlled by oscillation of the tone arm caused by the run-out groove for oscillating said arm member by means associated with said first named gear, said first named gear being operatively associated with said arm member causing movement of a portion of said arm member, said arm member being operatively associated with said clutch to render said clutch operative to cause rotation of said first shaft through 360° whereby said tone arm is raised and returned to inoperative position.

3. In record changing mechanism, the combination of a rotatable record table for supporting a record to be played, the record having a central aperture, a sound track and a run-out groove, means for rotating said table, a tone arm having pick-up mechanism adapted to be connected to reproduction mechanism, a fixed support for said tone arm, a hollow bearing post pivotally connected to said tone arm, a lifting rod slidably mounted in said post and adapted to raise and lower said tone arm, a lever for raising and lowering said lifting rod, a cam for operating said lever, a shaft for rotating said cam, a gear for rotating said shaft, a clutch between said shaft and gear normally inoperative, locking means for rendering said clutch inoperative, means for driving said gear, means operatively associated with said locking means and responsive to a predetermined condition to release said locking means through an angle of rotation of said shaft of substantially 360° whereby said gear is enabled to rotate said shaft through substantially 360°, and record supporting and delivery means disposed on the axis of rotation of said record table adapted to extend through the central apertures of a plurality of records and adapted to support said records in inoperative position above said record table, said last named means comprising a central reciprocatory rod having a compression head and record pilot adjacent its upper end for passing through the central apertures of the records, a stationary sleeve member through which said rod extends and provided with a support for a plurality of resilient washers of substantially no greater thickness than the thickness of the records and adapted to be disposed within the central apertures of records and normally of less diameter than the diameter of the record apertures, said sleeve having a cam, a quill member through which said sleeve extends having a plurality of resilient fingers extending to a point adjacent said cam, said quill being normally in a record supporting position on said sleeve wherein said cam causes expansion of said fingers to dispose them with a greater diameter than the record aperture diameter whereby said fingers support the lowermost record, said fingers being spaced from the lowermost washer supported on the washer support by a distance of at least the thickness of a record, said quill member being slidably movable on said sleeve to a record releasing position wherein said fingers are out of contact with said cam and disposed with a smaller diameter than the record aperture diameter, means for moving said quill member to its record supporting position, a pivoted flexible arm member, means movable with said last named means adapted to lock said arm member against rotation in one position and to unlock said arm member when said fingers are moved to expanded position, a lever operatively associated with said locking means rockably to release said locking means through an angle of rotation of said shaft of substantially 360° to cause the clutch to become operative to rotate the first named shaft through substantially 360°, a disk member on said shaft rotatable therewith, a connection between said disk member and said hollow post for oscillating said post, said connection including an oscillatable pawl movable by said disk member, a pawl fixed to said hollow post having teeth adapted to be engaged by said first named pawl, operative means movable by said disk and associated with said reciprocatory rod for compressing said washers to record holding position wherein the diameter of said washers are increased to support all except the lowermost record, means operatively associated with said quill member and said disk for moving said quill member to said record releasing position upon further movement of the disk thereby permitting movement of the lowermost record to supported position on the table ready to be played, detent means for limiting the movement of said second named pawl whereby the position of the tone arm is determined with respect to the beginning of a record sound track, rotation of the first named cam through 360° causing the tone arm to be lowered to playing position, return of said disk member to initial position causing the quill to be expanded to record holding position and release of the resilient washers from expanded position, and means controlled by oscillation of the tone arm caused by the run-out groove for oscillating said arm member by means associated with said first named gear, said first named gear being operatively associated with said arm member causing movement of a portion of said arm member, said arm member being operatively associated with said clutch to render said clutch operative to cause rotation of said first shaft through 360° whereby said tone arm is raised and returned to inoperative position.

4. A support for records to be played by a phonograph and the like, comprising an elongated member and a tubular member through which said elongated member extends, said members each being provided with shoulders and being relatively movable, resilient members between said shoulders, a quill embracing said tubular member and having resilient fingers biased to collapsed position, a cam on said tubular member adjacent said fingers for spreading said fingers from said collapsed position in record supporting position, said fingers being spaced from the lowermost resilient member by a distance substantially equal to the thickness of a record when the quill is in record supporting position, said tubular member and quill being relatively movable whereby said cam and fingers engage and disengage, said resilient members and quill being of less diameter than the diameter of the aperture of said records, said resilient members being of substantially less thickness than the thickness of said records, and means operatively connecting said tubular member, said elongated member and said quill and adapted to cause a predetermined sequential movement therebetween, whereby said resilient members are caused to move to record engaging and supporting position within the apertures of records, and said quill is subsequently moved to dispose said fingers in collapsed position.

5. In a record changing mechanism the combination of a rotatable record table for supporting a record to be played, the record having a central aperture, means for rotating said table, means for supporting in operative position records to be delivered to said table and for delivering one record at a time to said table, said last named means comprising an elongated member terminated in a head portion adapted to receive a plurality of records and a normally contracted resilient portion adapted to be expanded into engagement with the peripheries of the centering apertures of records received on said head portion, a fixed tubular member through which said elongated member extends and including a shoulder disposed adjacent said resilient portion, a cam surface formed on said tubular member adjacent said shoulder, a quill embracing said tubular member including integrally formed fingers normally biased into sliding engagement with said tubular member and disposed adjacent said cam surface, means operatively associated with said elongated member for reciprocating said elongated member relative to said tubular member for expanding said resilient portion and means operatively associated with said quill and said reciprocating means for reciprocating said quill and moving said fingers into and out of engagement with said cam surface thereby to move said fingers into engagement with the lowermost record while said resilient portion is contracted and out of engagement with said lower record while said resilient portion is expanded.

6. In a record changing mechanism the combination of a rotatable record table for supporting a record to be played, the record having a central aperture, means for rotating said table, means for supporting in operative position records to be delivered to said table and for delivering one record at a time to said table, said last named means comprising an elongated member terminated in a head portion adapted to receive a plurality of records, a normally contracted resilient member on said elongated member and adapted to be expanded into engagement with the peripheries of the centering apertures of records received on said head portion, a fixed tubular member through which said elongated member extends and including a shoulder disposed adjacent said resilient portion, a cam surface formed on said tubular member adjacent said shoulder, a quill embracing said tubular member including integrally formed fingers normally biased into alignment with said shoulder and disposed adjacent said cam surface, means for moving said elongated member relative to said tubular member for expanding said resilient portion and means for moving said fingers into and out of engagement with said cam surface thereby to move said fingers into engagement with the lowermost record while said resilient portion is contracted and out of engagement with said lowermost record while said resilient portion is expanded.

7. In a record changing mechanism the combination of a rotatable record table for supporting a record to be played, the record having a central aperture, means for rotating said table, means for supporting in operative position records to be delivered to said table and for delivering one record at a time to said table, said last named means comprising an elongated member terminated in a head portion adapted to receive a plurality of records, a normally contracted resilient member on said elongated member and adapted to be expanded into engagement with the peripheries of the centering apertures of records received on said head portion, a tubular member through which said elongated member extends and including a shoulder disposed adjacent said resilient portion, a cam surface formed on said tubular member adjacent said shoulder, a quill embracing said tubular member including integrally formed fingers normally biased into alignment with said shoulder and disposed adjacent said cam surface, means operatively associated with said elongated member for moving said elongated member and said tubular member relatively to one another for expanding said resilient portion and means operatively associated with said quill and said reciprocating means for engaging and disengaging said fingers with said cam surface thereby to move said fingers into engagement with the lower-most record while said resilient portion is contracted and out of engagement with said lower-most record while said resilient portion is expanded.

8. A support for records to be played by a phonograph and the like comprising an elongated member terminated in a head portion adapted to receive a plurality of records, a normally contracted resilient member on said elongated member and adapted to be expanded into engagement with the peripheries of the centering apertures of records received on said head portion, a fixed tubular member through which said elongated member extends and including a shoulder disposed adjacent said resilient portion, a cam surface formed on said tubular member adjacent said shoulder, a quill embracing said tubular member including integrally formed fingers normally biased into sliding engagement with said tubular member and disposed adjacent said cam surface, means operatively associated with said elongated member for reciprocating said elongated member relative to said tubular member for expanding said resilient portion and means operatively associated with said quill and said reciprocating means for reciprocating said quill and moving said fingers into and out of engagement with said cam surface thereby to move said fingers into engagement with the lowermost record while said resilient portion is contracted and out of engagement with said lowermost record while said resilient portion is expanded.

9. A support for records to be played by a phonograph and the like comprising an elongated member terminated in a head portion adapted to receive a plurality of records, a normally contracted resilient member on said elongated member and adapted to be expanded into engagement with the peripheries of the centering apertures of records received on said head portion, a tubular member through which said elongated member extends and including a shoulder disposed adjacent said resilient portion, a cam surface formed on said tubular member adjacent said shoulder, a quill embracing said tubular member including integrally formed fingers normally biased into alignment with said shoulder and disposed adjacent said cam surface, means operatively associated with said elongated member for moving said elongated member and said tubular member relatively to one another for expanding said resilient portion and means operatively associated with said quill and said reciiprocating means for engaging and disengaging said fingers with said cam surface thereby to move said fingers into engagement with the lower-most record while said resilient portion is contracted and out of engagement with said lower-most record while said resilient portion is expanded.

KENLY C. BUGG.

REFERENCES CITED

The following references are of record in the file of this patent:

UNITED STATES PATENTS

| Number | Name | Date |
|---|---|---|
| 2,287,098 | Habegger | June 23, 1942 |
| 2,330,293 | Knox | Sept. 28, 1943 |

FOREIGN PATENTS

| Number | Country | Date |
|---|---|---|
| 822,026 | France | Sept. 6, 1937 |